(12) United States Patent
Lehan

(10) Patent No.: US 6,316,087 B1
(45) Date of Patent: Nov. 13, 2001

(54) SYNTHETIC STRUCTURAL PANEL AND METHOD FOR MANUFACTURE

(76) Inventor: Warren Lehan, 1456 S. Evergreen Ave., Clearwater, FL (US) 33756

( * ) Notice: Subject to any disclaimer, the term of this patent is extended or adjusted under 35 U.S.C. 154(b) by 0 days.

(21) Appl. No.: 09/156,257

(22) Filed: Sep. 18, 1998

Related U.S. Application Data

(60) Provisional application No. 60/059,224, filed on Sep. 18, 1997.

(51) Int. Cl.[7] ............................... B32B 5/08; B32B 5/24; B32B 13/14
(52) U.S. Cl. ................. 428/294.7; 428/105; 428/221; 428/327
(58) Field of Search ...................... 428/294.7, 105, 428/221, 327

(56) References Cited

U.S. PATENT DOCUMENTS

| | | |
|---|---|---|
| 3,847,633 * 11/1974 | Race . |
| 4,084,982 * 4/1978 | Prior et al. . |
| 4,568,593 * 2/1986 | Green . |
| 4,781,994 * 11/1988 | Enoki et al. . |
| 4,868,039 * 9/1989 | Lehan . |
| 5,002,620 * 3/1991 | King . |
| 5,256,222 * 10/1993 | Shepherd et al. . |
| 5,350,554 * 9/1994 | Miller . |

* cited by examiner

Primary Examiner—Deborah Jones
Assistant Examiner—Jason Savage
(74) Attorney, Agent, or Firm—Charles E Lykes, Jr.

(57) ABSTRACT

The present invention comprises an improved structural panel with synthetic ingredients, such as vermiculite and fibers. The improved structural panel achieves enhanced lateral and surface integrity by the use of fibers within the core of the structural panel and adhesives and smooth materials (such as foil) as a surface coating. The invention further describes a method and apparatus for assembling such a structural panel.

4 Claims, 13 Drawing Sheets

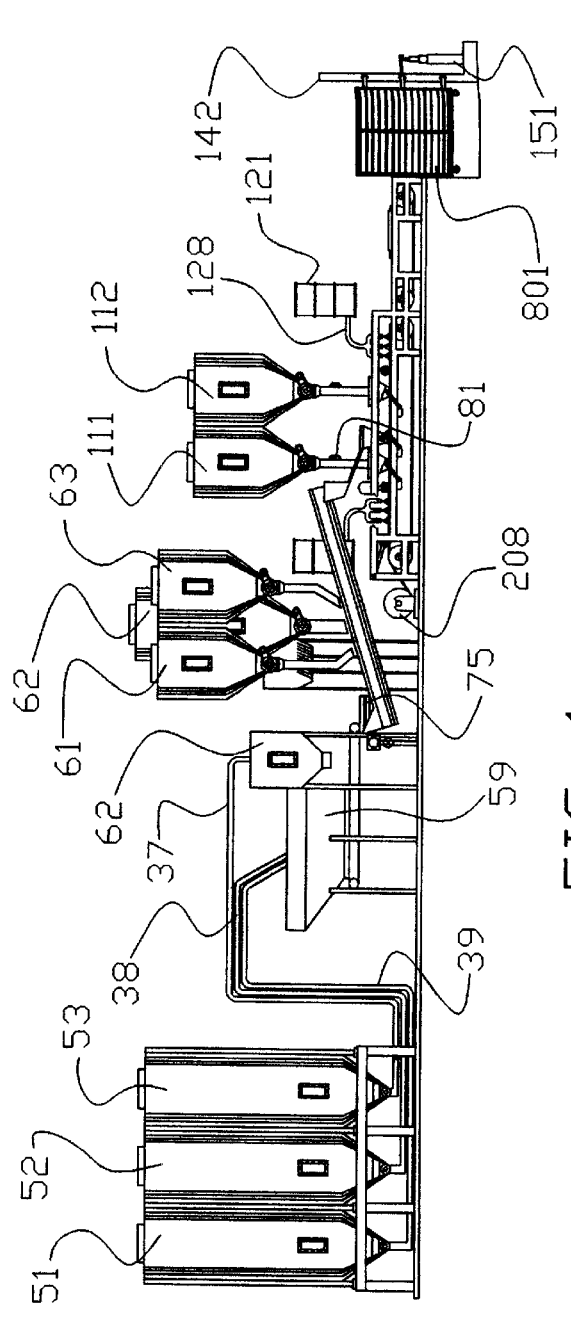
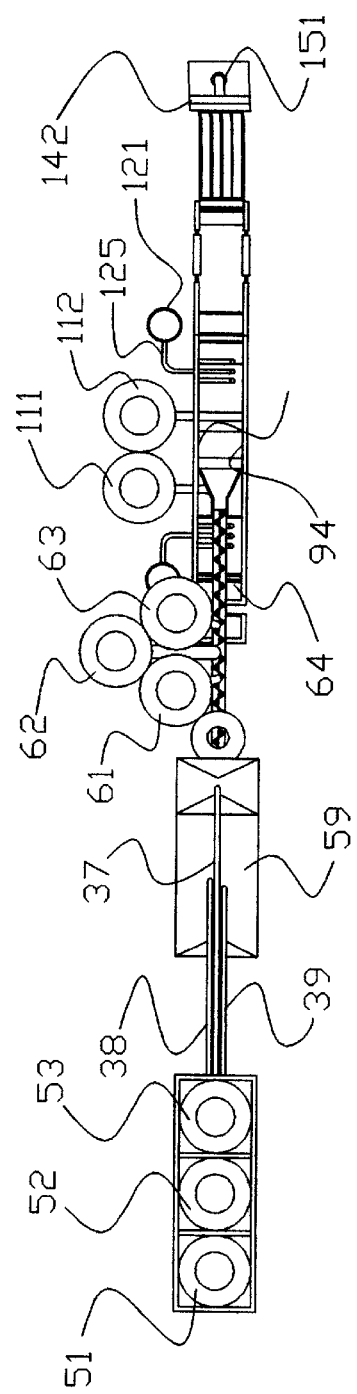
FIG. 1
FIG. 2

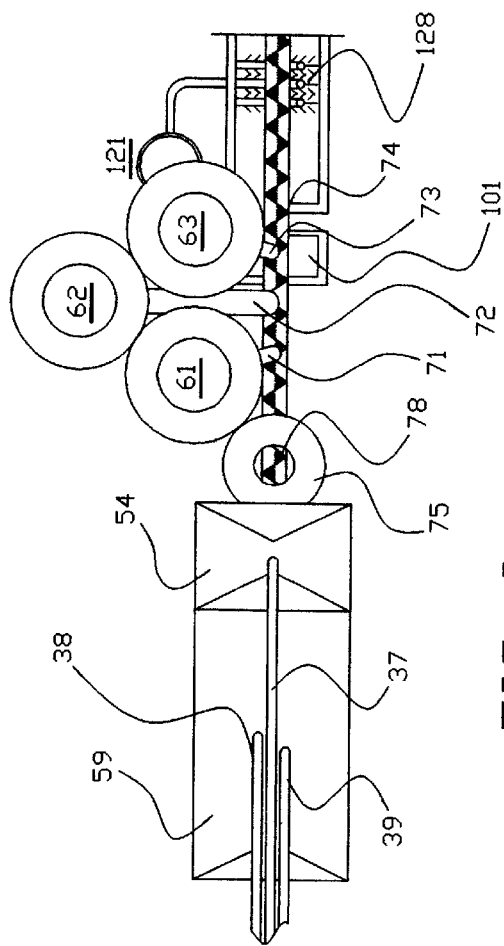
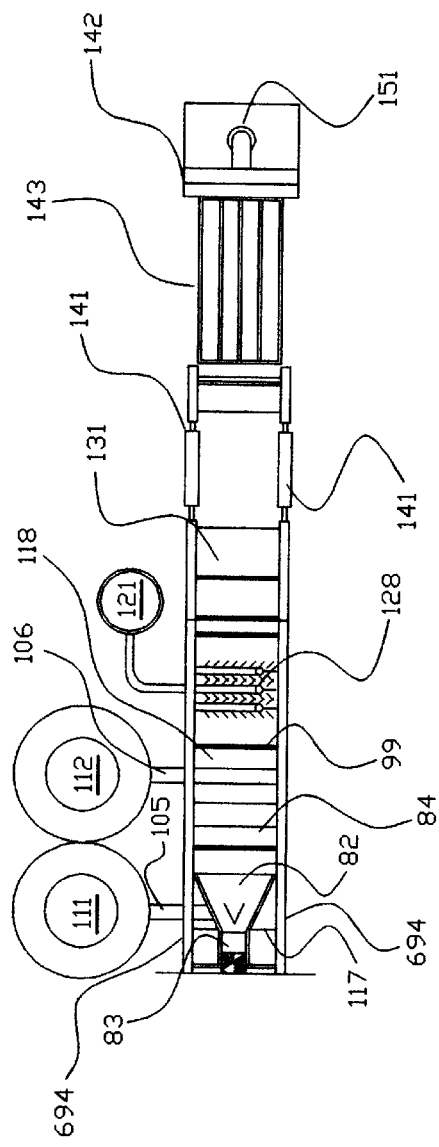

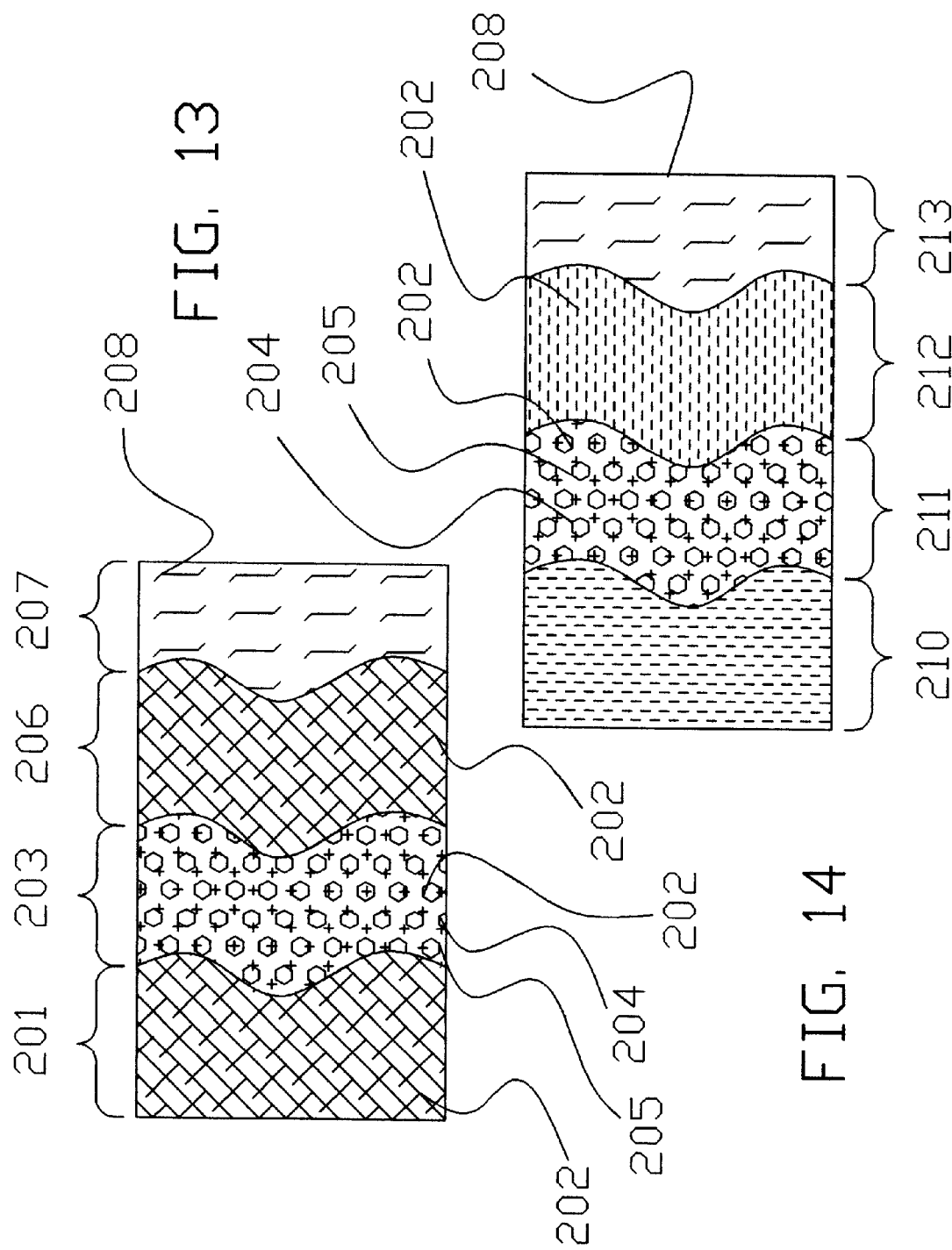

SYNTHETIC STRUCTURAL PANEL AND METHOD FOR MANUFACTURE

Reference is made to Disclosure Document No. 382,221, filed by the Inventor on Sep. 18, 1995, as well as to Provisional Patent Application No. 60/059,224, filed by the Inventor on Sep. 18, 1997.

FIELD OF THE INVENTION

The invention relates to structural panel of a synthetic type, particularly those which may be used to replace or supplement standard plasterboard, plywood, or other similar primary construction components.

BACKGROUND OF THE INVENTION

The interior portions of building construction are initially concerned with providing walls between building compartments and, in some cases, walls which may be required to withstand certain extraordinary pressures and conditions. For many years plywood and plasterboard were the primary materials involved in the production of panels which were standardized and used to provide these internal walls or barriers. Typically, such would come in sizes of 4×8 and would be disposed vertically. Additionally, interior building construction concerns flooring and ceilings.

Of particular interest in these structural panels are their qualities of strength; resistance to the passage of sound through the panel (its acoustic properties); resistance to fire and smoke; weight, resistance to being damaged by exposure to water or moisture; the ability to provide a flat surface; and the ability to be manipulated or positioned and fastened by nails, screws, or other building fasteners. Additionally, such structural panel should offer resistance to and protection from the elements of weather, insects, and provide good thermal insulation properties.

The Inventor previously obtained U.S. Pat. No. 4,868,039 in which vermiculite was used in a structural panel to provide strong and reliable wallboard with good acoustic, fire-retardant, and strength properties. Earlier efforts in providing synthetic wallboard were U.S. Pat. No. 1,439,954, issued to Emerson; U.S. Pat. No. 3,284,980, issued to Dinkel; U.S. Pat. No. 4,488,909, issued to Galer; and U.S. Pat. No. 4,102,700, issued to Kiveech et al. There is also some discussion of this topic in the text of Concrete Technology, Neville and Broke, Lemgmen Group, Ltd.; UK, 1987.

Since such structural panels are intended to be standardized and since a great number of structural panels are necessary to build even a simple structure (such as a residential dwelling), a primary consideration in the development of any such wallboard will be the ease and cost of its manufacture. Accordingly, inherent in the considerations of devising and creating such a wallboard would be a full consideration of the means and method of its manufacture.

One significant cost is that of transportation. Structural panel is used in mass quantities for many applications and the cost of shipping is great. There is also waste inherent in breakage and over stack ing or over ordering. Raw materials are cheaper and easier to transport, it would be helpful to have the ability to manufacture the structural panel at the work site. In this way breakage during shipping and over ordering would be avoided. Additionally, it would be easier to customize the structural panel composition in order to fit unique circumstances and situations.

In the Inventor's earlier invention, U.S. Pat. No. 4,868, 039, a means for manufacturing the original vermiculite board was disclosed. Such used a fibrous scrim as its surface and used Portland Cement and other traditional building cement ingredients mixed in with a vermiculite which were homogeneously mixed between the two layers of scrim. This provided a unique wallboard which had good weight, strength, fire-retardant-and moisture-resistant properties. One quality of such wallboard which was not always desirable was its surface tension. The original material, while very desirable in many respects, was brittle and required some improved capabilities to resist bending and to withstand lateral forces placed upon it This made it difficult to adapt for use as a floor material.

Accordingly, what is needed but not othewise provided in the prior art of synthetic structural panel is a reliable, strong, synthetic structural panel with good construction properties which also has a high level of surface cohesion and tension and may be manufactured efficiently and quickly. It would also be helpful to have a means and apparatus for accomplishing such quick and efficient manufacture.

What is not provided in the prior art is a synthetic structural panel which has superior qualities to resistance to lateral forces. Also not provided in the prior art is an efficient method and apparatus for manufacturing such a board. Also not provided in the prior art is such a manufacturing method and apparatus which can be moved to a construction site.

SUMMARY OF THE INVENTION

The Inventor has overcome the shortcomings of the prior art by improving his basic vermiculite wallboard method and apparatus with a new structure which incorporates the use of certain adhesives and fibers in order to improve surface tension and cohesion and boost the structural panel's ability to withstand lateral pressures. The Inventor has also developed a method and apparatus of manufacturing such a board which is efficient and reliable. Both the structure of the board and its method of construction are the subject of this disclosure.

The apparatus and structural panel can be described as follows. Traditional building cement materials are housed in vats and are primarily mixed as desired to achieve certain weight and strength goals. As these materials are primarily mixed together, they are then passed into an area where they encounter further mixing with both the synthetic ingredients and the binding liquid, such as water. These ingredients are thoroughly mixed and may be passed along by means of a mixing conveyor assembly. In the mixing conveyor assembly further mixing occurs as these ingredients are passed along and begin to experience some preliminary hardening.

At this stage, these ingredients may then be passed into a final mixing area wherein fibers may be added to the mixture and in which the surfaces of the mixture may be sprayed and cured with surface hardening materials such as acrylics and epoxies.

The fibers within the mixture serve to give the structural panel more lateral strength and the addition of the exterior adhesives and/or epoxies assist in providing a stronger surface cohesion and tension. The board may then be exposed to outer levels of foil. The foil may be used to provide thermal transfer properties, resistance to water or fire.

Following the provision of these finishing touches in a final mixing area, the wallboard may be then placed in storage trays for final hardening and curing. Normally a period of time of twelve to twenty-four hours is required for full curing. During this time, the material could be exposed to heat to speed or otherwise enhance the process.

Additionally, the Inventor has developed apparatus and methods for transporting the manufacturing apparatus so that structural panel may be built at the site. This would permit the use of as many acceptable local materials as possible and permit custom-mixing of the structural panel blend.

It is, then, an object of the present invention to provide an improved structural panel with improved lateral and surface strength qualities.

It is a further object of the present invention to provide a means and apparatus for manufacturing wallboard with improved lateral and surface strength qualities.

It is a further object of the present invention to provide such a wallboard which may be further augmented with a smoother surface or foil surface for improved esoteric or strength, water or fire resistance, or other qualities.

It is a further object of the present invention to provide a means and apparatus for providing such a improved structural panel with a foil or other smooth surface for desired thermal, fire or water resistant or other properties.

It is a further object of the present invention to describe means and methods of manufacturing such boards which further depict the specific apparatus assembly.

It is a further object of the present invention to describe a means and method of providing such a structural panel with attention given to the steps involved in the process, including mixing, assembly, and curing.

It is a further object of the present invention to describe means and apparatus for on-site manufacture of such fibrous structural panel.

Other features and advantages of the present invention will be apparent from the following description in which the preferred embodiments have been set forth in conjunction with the accompanying drawings.

BRIEF DESCRIPTION OF THE DRAWINGS

In describing the preferred embodiments of the invention reference will be made to the series of figures and drawings briefly described below.

FIG. 1 depicts the overall apparatus comprising the storage chambers for the various components, the primary mixing areas, the mixing conveyor and tray conveyor, and the collection point.

FIG. 2 depicts the overall apparatus as viewed from above.

FIG. 8 depicts the mixing portion from above.

FIG. 9 depicts the conveyor assembly from above, further depicting where various ingredients may be added.

FIGS. 13, 14, and 15 depict alternative embodiments of wallboard according to the present invention.

Figure 3:
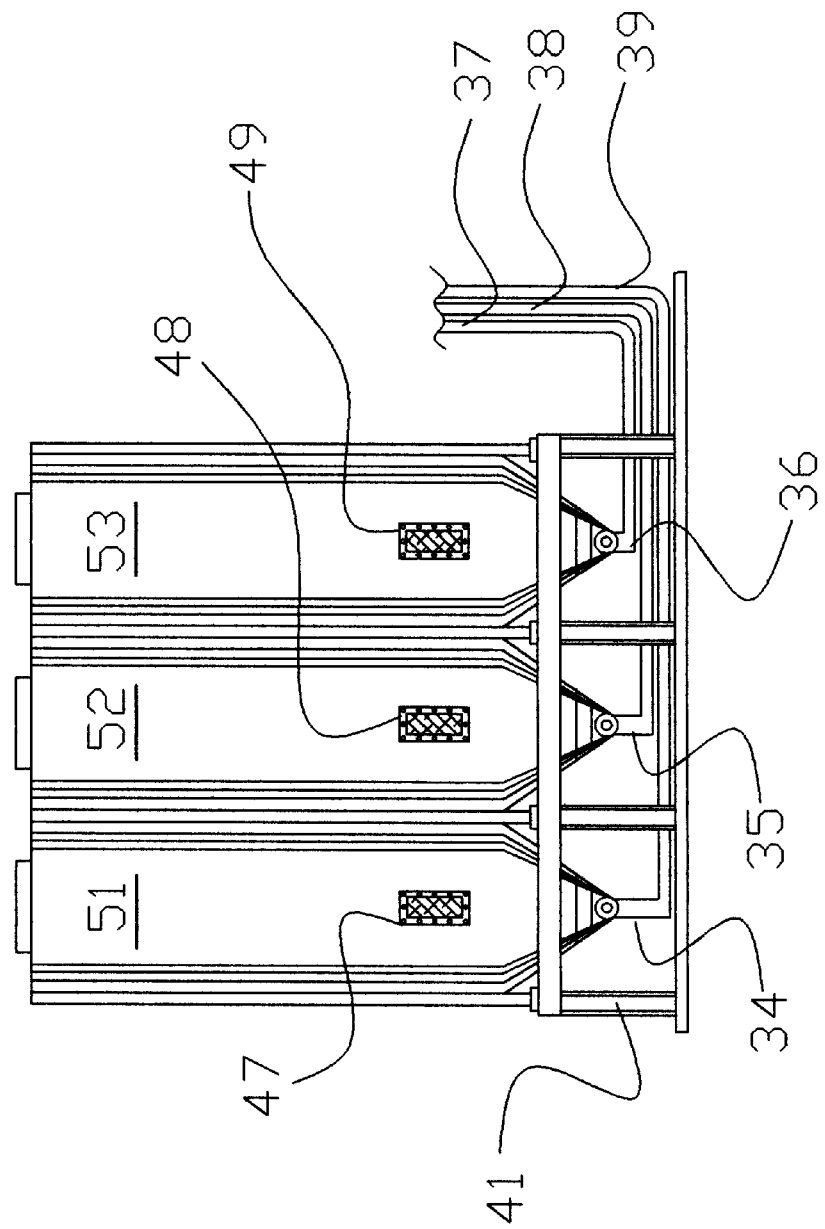
FIG. 3 depicts the storage chambers for the primary ingredients.
Figure 4:
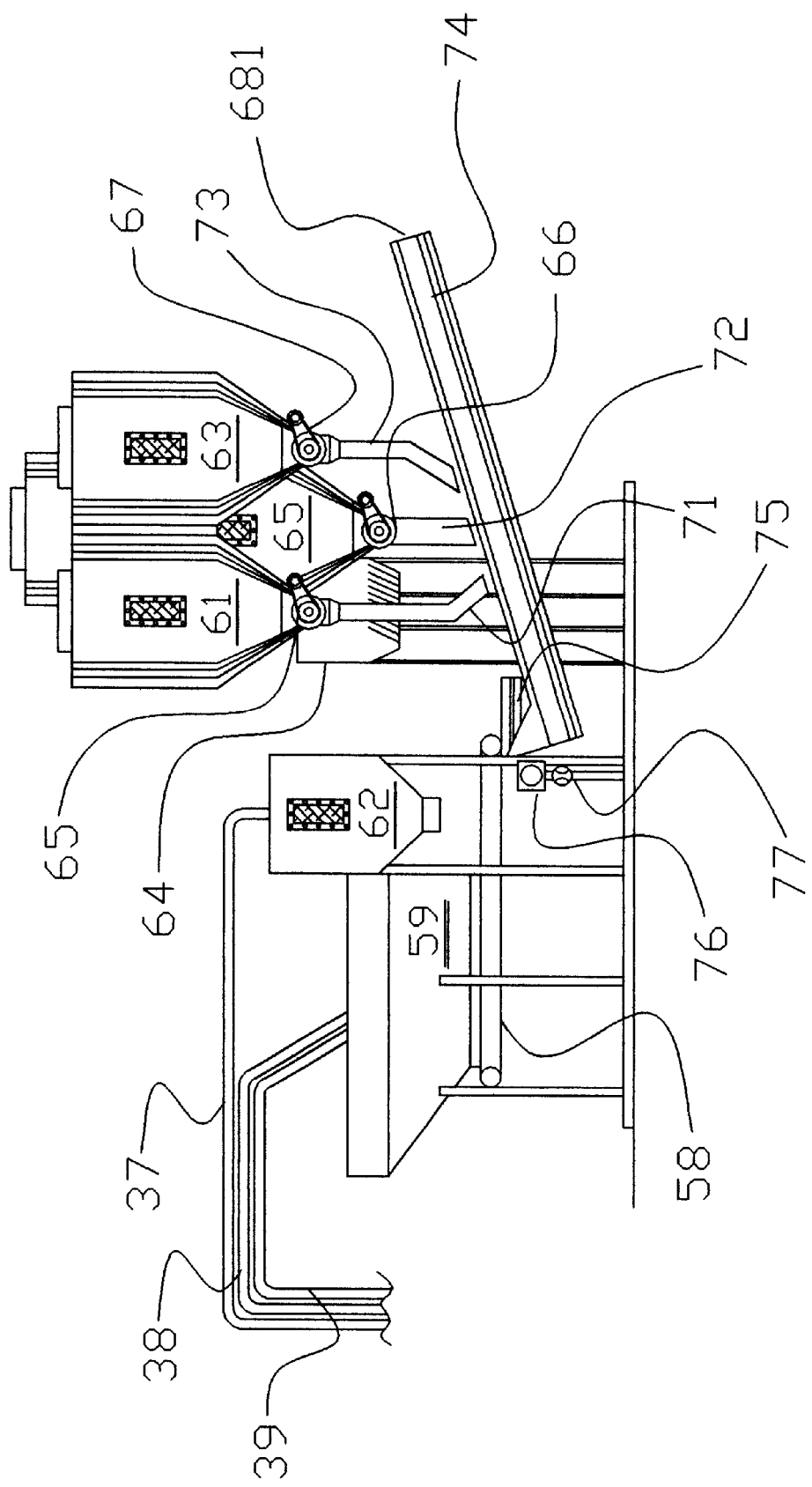
FIG. 4 depicts the portion of the apparatus in which the mixing of the ingredients initially occurs.

While certain drawings have been provided in order to teach the principles and operation of the present invention, it should be understood that, in the detailed description which follows, reference may be made to components or apparatus which are not included in the drawings. Such components and apparatus should be considered as part of the description, even if not included in such a drawing. Likewise, the drawings may include an element, structure, or mechanism which is not described in the textual description of the invention which follows. The invention and description should also be understood to include such a mechanism, component, or element which is depicted in the drawing but not specifically described.

DETAILED DESCRIPTION OF THE PREFERRED EMBODIMENT

Reference will now be made in detail to the present preferred embodiment of the invention, an example of which is illustrated in the accompanying drawings. While the invention will be described in connection with a preferred embodiment, it will be understood that it is not intended to limit the invention to that embodiment. On the contrary, it is intended to cover all alternatives, modifications, and equivalents as may be included within the spirit and scope of the invention defined in the appended claims. Each part will be explained by its function and number relating to the figures which have submitted herewith.

It is helpful to first examine the overall apparatus used to manufacture the improved synthetic structural panel according to the present invention. It is also helpful to discuss the manufacture of the board in phases.

In the first phase of the operation certain well-known building cement ingredients are blended together. These include clay particles, volcanic aggregate, and Portland cement. Of course, there may be others, but these are three of the more common ones. These ingredients may initially be stored in a clay particle vat (51), a volcanic aggregate vat (52), and a portland cement vat (53). Additionally, each of these storage vats (51, 52, and 53) are mounted so that they are in a mounting frame (41), and adapted with respective valve means (34, 35, and 36), and valve control means (47, 48, and 49). Each of the valves (34, 35, and 36) feed respective conduits (39, 38, 37) which will ultimately deliver the ingredients to a mixing chamber (51). It should be noted that the Portland cement line (37) feeds into a separate chamber (52) so that its rate of flow into the overall chamber may be more closely controlled and adjusted. Accordingly, in the first phase of the operation the typical dry ingredients are carefully blended into a homogeneous mixture.

From this point the process is now ready to enter the second stage in which certain synthetic ingredients are blended in to the mixture with water. Additionally, lime can be applied at this point from a lime vat and spreader (64).

In a typical apparatus may be used to contain sources of high-intensity plasticisers (61), vermiculite (62) , and fiber (63), respectively. Additionally, lime could be stored in a separate vat (64). The high-intensity plasticizer vat (61), the vermiculite vat (62) , and the fiber vat (63) are each adapted with respective control valves (65, 66, and 67, respectively).

These are each deposited through respective conduits (71, 72 and 73, respectively) into a mixing conveyor (74). In this mixing conveyor (74) all of the ingredients (61, 62, and 63), including the original dry ingredients and the new synthetic ingredients may be mixed with a rolling action and further blended with a source of water (75).

The water may, but need not be, applied through an injection ring (76). The injection ring (76) would be connected to a water source (not depicted) by means of a pressure valve (77). The interior portion of the injection ring (76) would be adapted with a series of ports (78). Water, under pressure, could be injected into a flow of the solid elements before it is deposited into the screw mixing conveyor (74) which will be described in more detail later in this application.

At this point, all of the primary ingredients have been added. By the time they are prepared to leave the exit port (81) of the mixing conveyor (74), they should be homogeneously blended with the appropriate amount of water. They are now fed into a feeding assembly (82) through an intake port (83) so that they may be then deposited into a cement hopper (84). The cement hopper (84) spreads the blend out so that it may be placed upon a conveyor belt (91) which is turned by a pair of rollers (92 and 93). The conveyor belt (91) is, however, first fed with an aluminum backing foil (208) which is supplied by a roller (102) on a mounting assembly (103) which is adapted to spread it along the width (694) of the conveyor belt (91).

It should be described that this conveyor belt (91) may be adapted with sections (95) within which a mold (94) in the dimensions of structural panel (typically 4'×8') is made. As will be described in more detail later, such mold (96) receives the foil (208) which will form one surface of the structural panel. The foil (208) is pressed into the mold (96) by means of an upper roller (97). The foil (208), after being pressed into the mold (96), is sprayed with a rapid hardening adhesive (97) from a sprayer (98). In this manner the foil (208) gains rigidity to help form the structural panel. Calcium chloride (622) may be used to accelerate the adhesion and rigidity of the foil.

Now the blend may, but need not, be augmented with additional fibers which are fed from two separate fiber vats (111 and 112, respectively) which may each in turn be controlled by their own valves (113, 114, respectively) and fed upon the structural panel blend by their own respective conduits (105, 106) and hoppers (117, 118). In addition, apparatus may be supplied for applying a final finishing coat of adhesive to the blend. Such finishing coat means is depicted at (121). Such finishing coat means could include separate chambers for a variety of adhesives such as epoxy (122), acrylic (123), and could further be adapted with a spraying or atomizing chamber (124) and fed through a conduit (125) so that it could be sprayed through spray jets (128). Now, all ingredients of the board have been supplied and the board is fully blended.

The blended structural panel (104), now within a hardened tray and just beginning to cure, is subject (through the conveyor belt (91)) to vibrator (104). The vibrator (104) enhances the settling of the blend and promotes a more effective disposition of the fibers (202). This enhances the bonding of the ingredients as well by settling them in closer together and promoting the passage of fluid from one constituent ingredient to another.

At this point, it should be mentioned that vermiculite has superior properties to perlite in this regard. This is because vermiculite is better able to absorb and release fluid during the curing process and consequently, makes better bonds with the other ingredients.

Having been blended, the board (104) may now be applied to a separate conveyor assembly (131) which comprises two additional conveyor rollers (132, 133) and a conveyor belt (134).

A tray (141) housing a blended mixture (104) can then be passed along this conveyor (134) and inserted into a drying rack assembly (142). The drying rack assembly (142) could be comprised of a series of rack-drying compartments (143), which may be vertically moved up and down to receive a given structural panel tray by means of a vertical rack (151).

Accordingly, the overall structure of the device has been described. Now, more detail can be used to discuss various functions of each part and the options available with their use.

Figure 15:
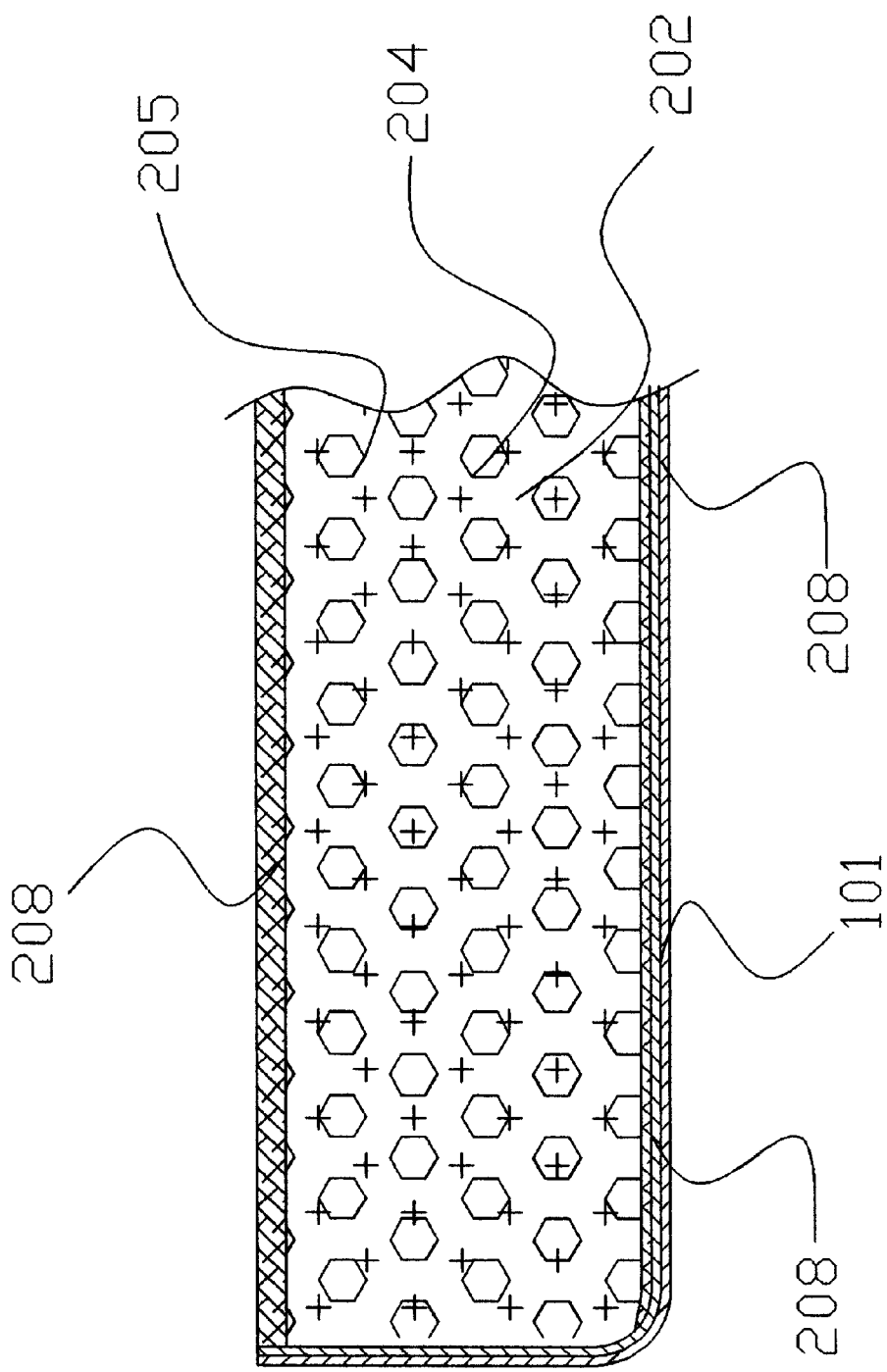

Making reference to FIGS. 13 through 15, the various forms of the utilization of fibers in the boards can be seen.

For instance, in FIG. 13 is depicted a structural panel which is cut out at various levels. It can be seen that at an upper level (201), a layer of fibers (202) are diagonally disposed in various dimensions. Then, in the next level (203), the structural panel blend (204) is applied. The structural panel blend (204) is then supplemented with the primary synthetic ingredients (205), which may be perlite or vermiculite. Then in the next level (206) another layer of fibers can be applied which are again diagonally disposed to include both directions. Then, in the lower level (207), the foil cover (208) is seen.

This blend would require first an application of epoxy over a lower level of foil (208), then the fibers (202), then the structural panel blend (204) including vermiculite (205), for instance, then another layer of the fibers (202) which would then prepared for another level of adhesive to be sprayed onto the panel (not depicted in FIG. 13).

FIG. 14 depicts another embodiment in which fibers would first be positioned at a lower level (210) in a vertical disposition. Then, in another level (211), the structural panel blend (204) including the vermiculite (205) could be blended with additional fibers which are randomly disposed (202). Then in the next layer up, the fibers (202) can be disposed in a horizonal manner and then in the final layer (213) the foil (208) may be applied. This would again require an epoxy (121).

FIG. 15 shows yet another possible disposition of the material. In FIG. 15 is shown a homogeneous blend of fibers (202), structural panel blend (204), and vermiculite (205) which is sandwiched between a level of foil (208) and some other surface, such as a slurry formed by the vibration of said structural blend, and which is further augmented with fibers (202) along the lateral surfaces of the board.

It should be noted that while the basic components of the wallboard will be standard building cement materials (such as clay grog and portland cement) augmented with known synthetics (such as vermiculite and perlite), the feature of the present invention which achieves the desired result is the addition of synthetic fibers into the mixture. The synthetic fibers provide the desired tensile strength. It should be noted that there are two principal ways of achieving the addition of the fibers which, while both keep within the spirit and scope of the present invention, are somewhat different. In one method of combining the ingredients the fibers may be laid out between successive layers of the aggregate and other synthetic materials within a single panel. In another method of combining the ingredients the fibers may be simply mixed in a homogenous manner along with the other synthetic and standard cement ingredients. Either of these two basic forms of mixing the ingredients may be used with any one of the various methods of surfacing the product which will be developed later in this description.

Generally speaking, the overall process comprises the following steps. First, certain materials are dry-blended together. These materials primarily comprise traditional cement materials, such as clay grog, clay dust, and portland cement. This is normally accomplished in a series of bins and hoppers which may run along conveyor belts. Lime may also be mixed into the blend.

Once the dry ingredients are blended, they may be further combined with vermiculite or perlite in a wet screw mixing conveyor. The wet screw mixing conveyor will ensure a thorough blending of all of the se ingredients. The wet mix will include water, but may also include high-intensity plasticizers, such as latex, acrylic, or epoxy-acrylic parts in a ten-to-one mixture.

All of these mixed ingredients may then be placed in a single hopper over a mono-flow pump. A mono-flow pump which would be suitable for this application might be the [Moyno] MOYNO (R) pump. Such a pump must be capable of pumping solid or abrasive materials which are suspended in liquids. It should also be considered that such suspended solids may also comprise a high percentage of the fluid or semi-fluid material to be pumped. Now that the blend is thoroughly mixed (including the water or high-intensity plasticizer), they are then placed in a hopper over the mono-flow pump where they may be transferred to a conveyor or belt hopper and further pressed into pre-molded foil fibrous trays.

It is at this point that the fibers may be added to the structural panel. One means of adding the fibers to the structural panel will include the provision of the blended material in layers. A layer may be perhaps a quarter inch, but the layers could be thicker or thinner as desired. These fibers could also be entered into the wet mix at the very beginning of the process and could be anywhere from ¼" to 8 ft.in length. The epoxy acrylic could be sprayed onto the fibers as they are being moved onto the conveyor belt Clay grog or any fixed clay particles or volcanic aggregate (or a combination in any desired blend) may also be used with the board along with the fibers.

Additionally, layers of fibers could be put into the premade tray after each quarter inch of wet mix slurry so as to increase the overall strength by creating a thin webbed layer of overlapping fibers and then spraying a coat of epoxy acrylic Part A and B in order to bond to the wet cementitious slurry.

The overall effect of this will be a series of plied layers. This increases the overall strength of the material and also affords better resistance to nail through-put.

As described, maximum strength is reached after seven days of composition curing. When fully cured, the panel may be applied to standard construction applications in the same fashion as plywood. The only difference would be that the cutting of this material should be accomplished with a diamond-studded blade and standard electrical saws. Accordingly, while this material may be somewhat more difficult for the garage carpenter to use than plywood, its utility in commercial and construction applications is very high and its durability and resistance to wear very high, as well.

Figure 5:
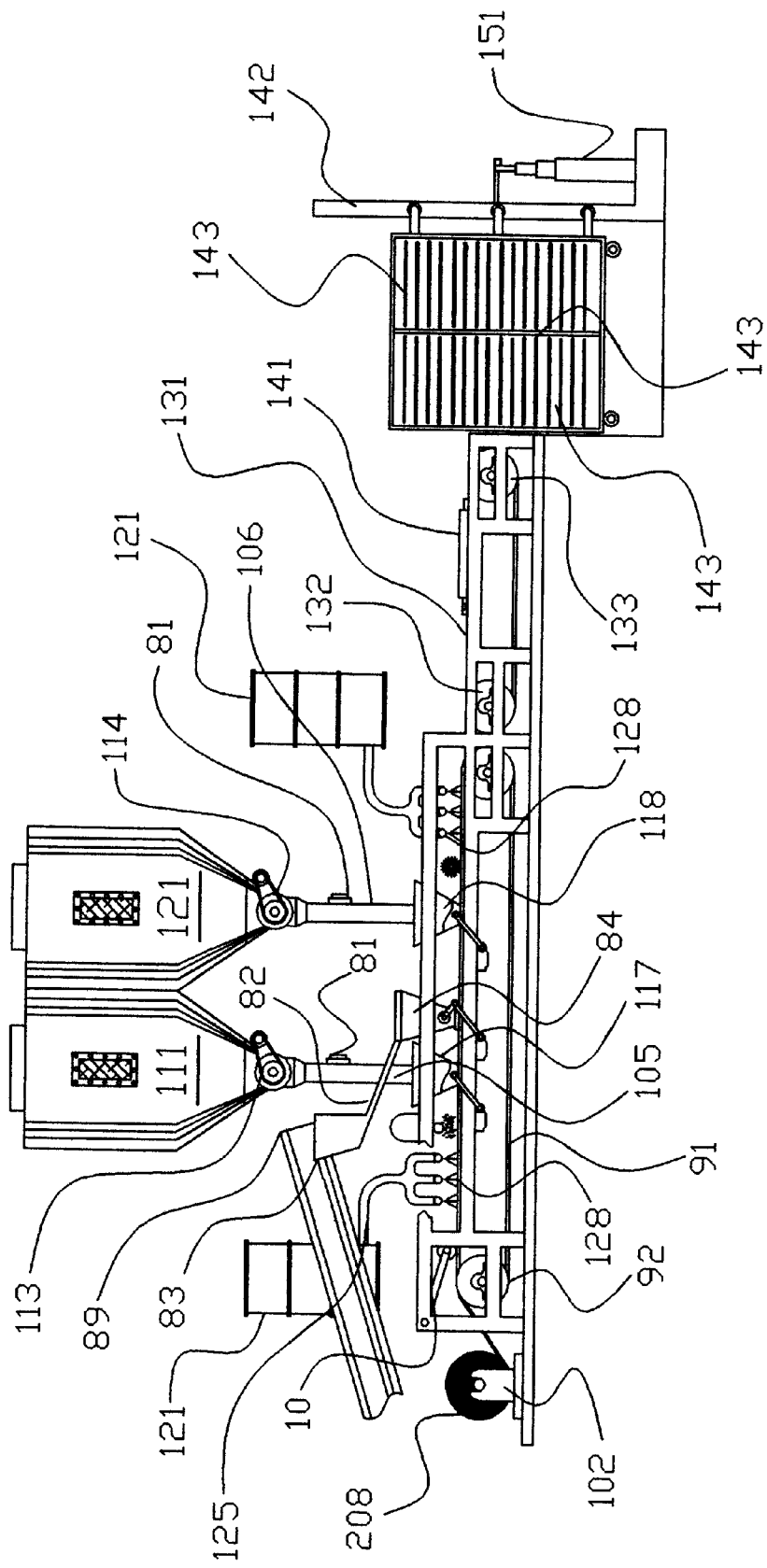
FIG. 5 depicts the conveyor apparatus at which the primary mixed ingredients are sent for hardening and may be further augmented with fiber and sent to a drying rack.
Figure 6:
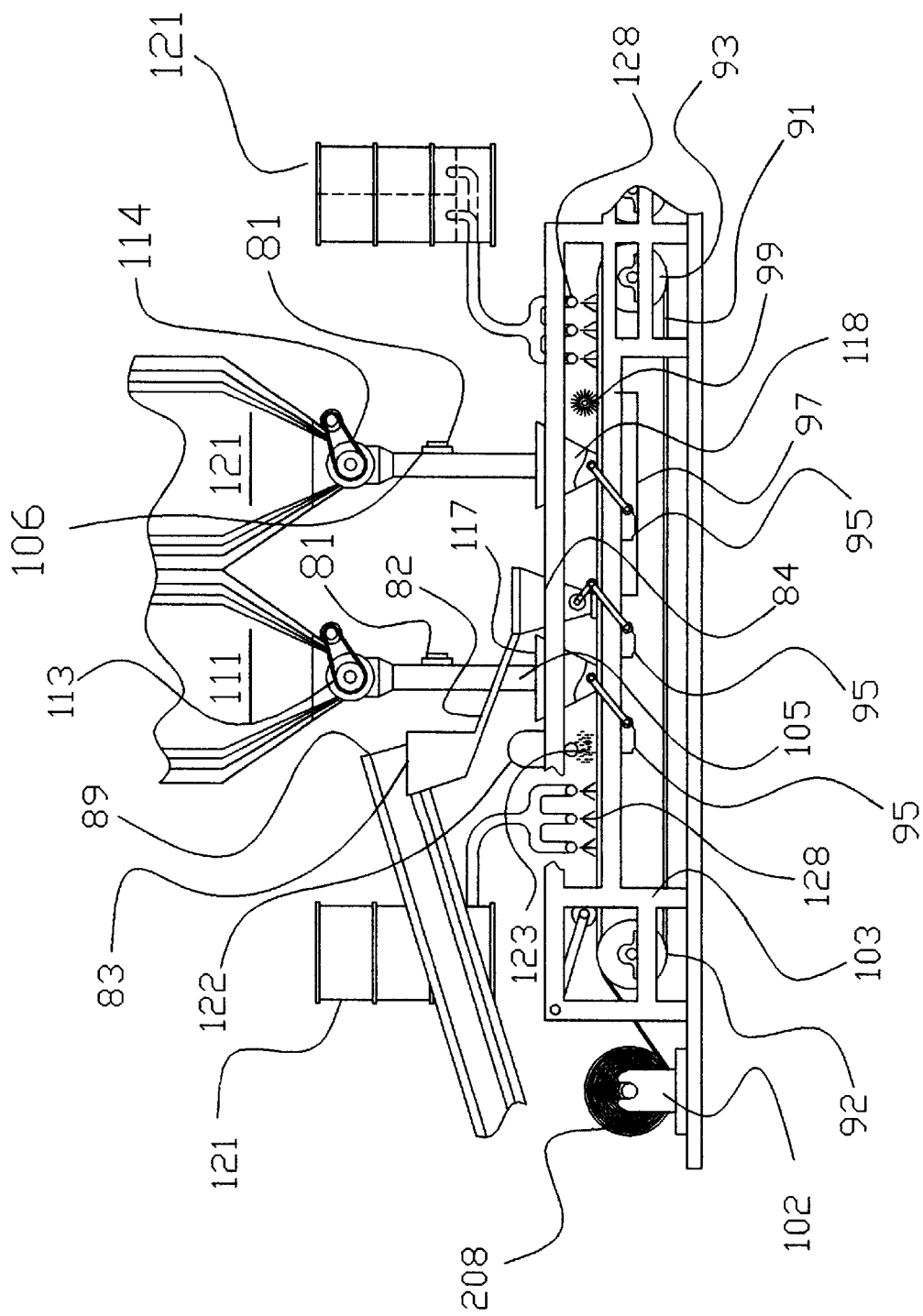
FIG. 6 depicts the mixing area.

During wet mixing, the vermiculite, perlite, or desired vermiculite/perlite combination may be mixed in to the blend, which is now transported through the mixing conveyor (74) (such as the MOYNO (R)) to the structural panel molds. The blend may be dispensed from a flanged nozzle (82) into a cement hopper (84) and then evenly spread along the mold (94). These molds (94) may then be passed by a conveyor (91) and then passed along under a fiber feeder (118) and a sprayer (128) for the epoxy acrylic. (Please see FIG. 5.)

As mentioned before, the fibers (202) could be applied either as part of the blend through the pump (81), or in layers. It can be seen that the layers could be applied through the cement hopper (84) in any desired thickness. Then the molds (94) could be passed under the fiber rotary feeder (118) and epoxy acrylic sprayer (128) as many times as desired before curing. If the fibers (202) are to be part of the blend, however, then the layering stages are omitted and the epoxy acrylic will be applied to the fibers as the fibers are fed into the wet mix.

Figure 7:
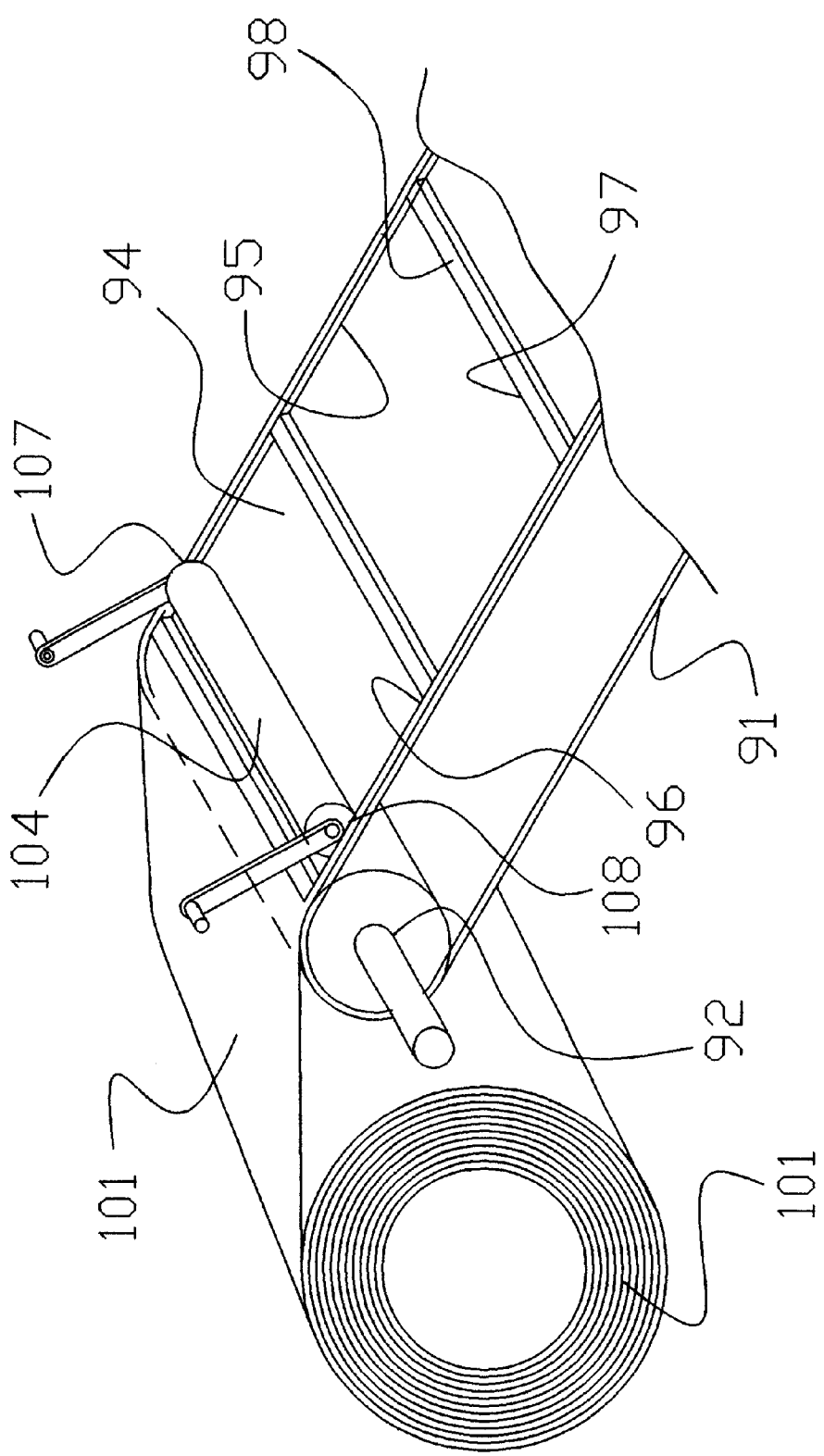
FIG. 7 depicts the conveyor and, in particular, a mold compartment.

The operation of the foil (208) and the mold (94) should be discussed. Making reference to FIG. 7, it can be seen that each mold (94) is within a section of conveyor belt (91), and is adapted with front and rear sides (97, 98, respectively) and lateral sides (95, 96). As foil (208) is fed from the foil roll onto the conveyor (91), a roller (104) presses the foil (208) down into the mold (94). The sides (107, 108) of the roller fit down into the mold (94) in close proximity to the mold sides (95, 96). In this manner the foil (208) is pressed into position to receive the structural panel blend (104). Calcium chloride, or some other suitable material, may then be applied to the mold (94) in order to promote initial rigidity of the structural panel blend (104) and to promote bonding between the structural panel blend (104) and the foil (208).

While the invention has been described with respect to a specific method, apparatus, and composition, it is important to note that the ultimate panel could be made with varying proportions of the described materials or with a variety of obvious substitutions or substitute materials which may later be discovered. Each of these should be considered as keeping within the spirit and scope of the present invention. Additionally, the specific apparatus could be modified so as to use different styles of bins, valves, flanges, feeders, mixers, and spreaders than those depicted, or with a different order, as long as the basic tenets of the formula and method of blending the materials is preserved. Such variations should also be considered as keeping within the spirit and scope of the present invention.

The foil tray (usually aluminum, but any other foil substance could be used) is coated with the epoxy acrylic mixture with the fibers already dispensed in the foil mold.

Such foil typically comes off of a roll with is 49 to 49–½ inches wide and can be pressed flat to produce a square tray that can become part of the board itself.

As described, maximum strength is reached after seven days of composition curing. When fully cured, the panel may be applied to standard construction applications in the same fashion as plywood. The only difference would be that the cutting of this material should be accomplished with a diamond-studded blade and standard electrical saws. Accordingly, while this material may be somewhat more difficult for the garage carpenter to use than plywood, its utility in commercial and construction applications is very high and its durability and resistance to wear very high, as well.

Additionally, the synthetic fibers may be made from a variety of fiber materials. Many of these are plastic synthetic materials, but there may be other acceptable forms of fibers which could be used. The importance of the fibers is that they give the structural panel lateral strength and integrity which was lacking in prior blends of the material.

There are a variety of epoxies which can be stored in separate chambers and, when sprayed together and allowed to blend together, will form a very tight bond. Such an adhesive could be sprayed on either or both sides of the surface of the structural panel.

The known fillers include such things as vermiculite particles and perlite particles. The synthetic fillers may be made of a variety of sizes or sized randomly, as long as they can fit within the width of a structural panel.

Additionally, this surfacing could take place either before or after curing of the remaining ingredients of the structural panel or at a desired point in time during the curing process.

It should also be noted that the curing process itself blends itself to several alternatives. For instance, the curing process could be allowed to occur in ambient air in a natural manner or it could be enhanced by the application of heat.

It is envisioned that a rack could be used to hold a variety of structural panels, but this need not be the case.

It should further be noted that in addition to substituting or changing certain of the ingredients the relative amounts of the various ingredients can be modified in order to achieve certain desired results. For instance, if strength is not a critical an issue as having a very light-weight material, more of the synthetic filler could be used so as to make the structural panel lighter, but the use of more of the synthetic fillers would naturally cause the structural panel to be less strong than one which was made more with traditional building cement materials.

It is in this way that the fibers offer an advantage over the previous editions which did not have fibers.

From examination of FIG. 1, it can be seen that the manufacturing process of structural panel according to the present invention basically occurs in three phases. The first phase involves the dispensation and mixture of cement materials from large cement vats. In the second phase, the filler material (either vermiculite or perlite) is mixed in with the cement mixture and water and the material is shaped into a panel by use of a foil mold. A conveyor belt is used to facilitate this process. During this phase, storage vats are immediately present for the vermiculite, perlite, and certain fibers and adhesives, and the first of two conveyors is present. Additionally, an outlet for the water and a vibrating mechanism for the purpose of refining and homogenizing the structural panel is provided.

In the third and final phase, additional fiber vats are present and another conveyor is used to transport the structural panel (which has, in the second phase, been molded and shaped into a panel and adapted with surfaces) into drying racks. Additionally, additional adhesives could be added at this time and some work could be done on the surfacing of the structural panel.

What is unique about considering this manufacture in these three phases is that, when viewed as a whole, the manufacturing process could not be transported. If, however, the equipment necessary to accomplish each of these three phases is separated, as they can be, the equipment of any one of these three phases of operation could be placed on a trailer suitable for being towed by a truck and delivered over a highway.

In this manner, a portable structural panel manufacturing operation could be established near a large work site and a contractor or a construction team would have the capability of assembling exactly the type and specification of structural panel desired, be sure of its quality and integrity, and save substantial transportation costs and losses due to waste.

"The portable apparatus could be mounted on a surface such as the bed of a large trailer (400)."

Figure 10:
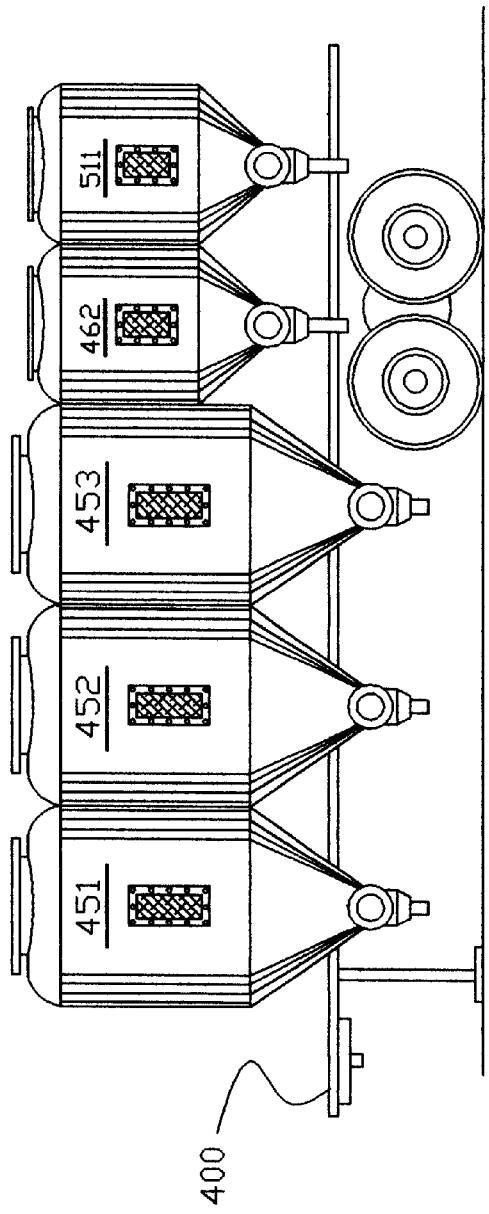
FIG. 10 depicts an alternative embodiment in which storage vats for the various ingredients may be mounted on a trailer.
Figure 11:
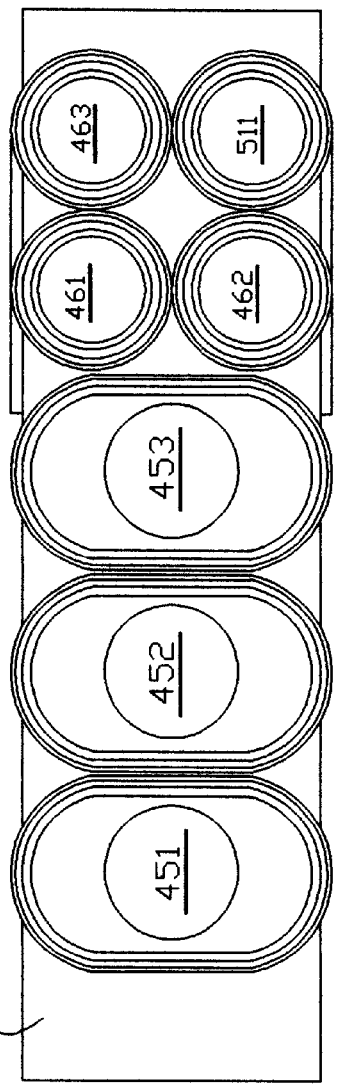
FIG. 11 depicts one a top view of trailer-mounted storage vats.
Figure 12:
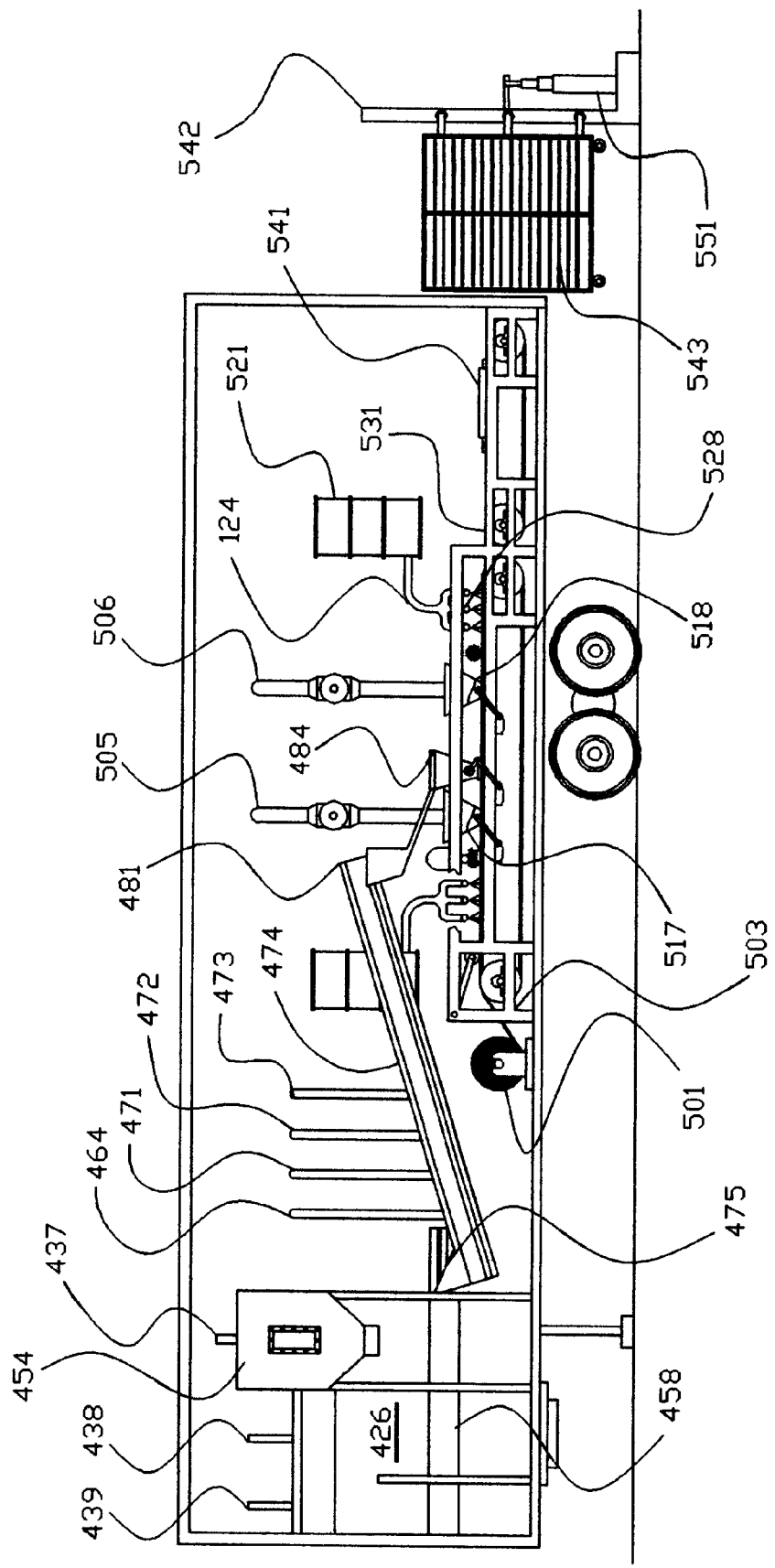
FIG. 12 depicts a trailer-mounted mixing portion.

To further show the feasibility of this, FIGS. 10, 11, and 12 show the portions of the apparatus as they could be(separated). FIG. 10 depicts the storage vats for the solid ingredients cement vats in isolation. FIG. 11 depicts them as arranged from above. FIG. 12 depicts the manufacturing stages, as mounted on a truck.

Each of these corresponding mechanical components works exactly the same as its counterpart in FIGS. 1 through 10. The portable apparatus could be mounted on a surface such as the bed of a large trailer (400).

What is significant about the differences between the components as depicted in the trailer mount manufacturing assembly of FIG. 12 is that inlet ports (437, 438, 439, 464, 471, 472, 473, 505, and 506) depict the receiving inlet ports to receive the respective solid components transmitted from the storage vats (FIGS. 10 and 11) through transporting conduit (not depicted in either figure). In all other respects, however, but for the fact that the apparatus is indeed loaded on a trailer (500), the apparatus works the same. For instance, inlet ports (437, 438, and 439) receive the primary traditional cement ingredients. Inlet ports (464, 471, 472, and 473) receive the filler and fibers. A water ejector (475) works the same as its permanently installed counterpart. In each other case, it is a simple matter to consider the last two digits of each feature as labeled on FIG. 12 to be the same as its counterpart with the same last two digits in FIGS. 1 through 10.

Figure 16:
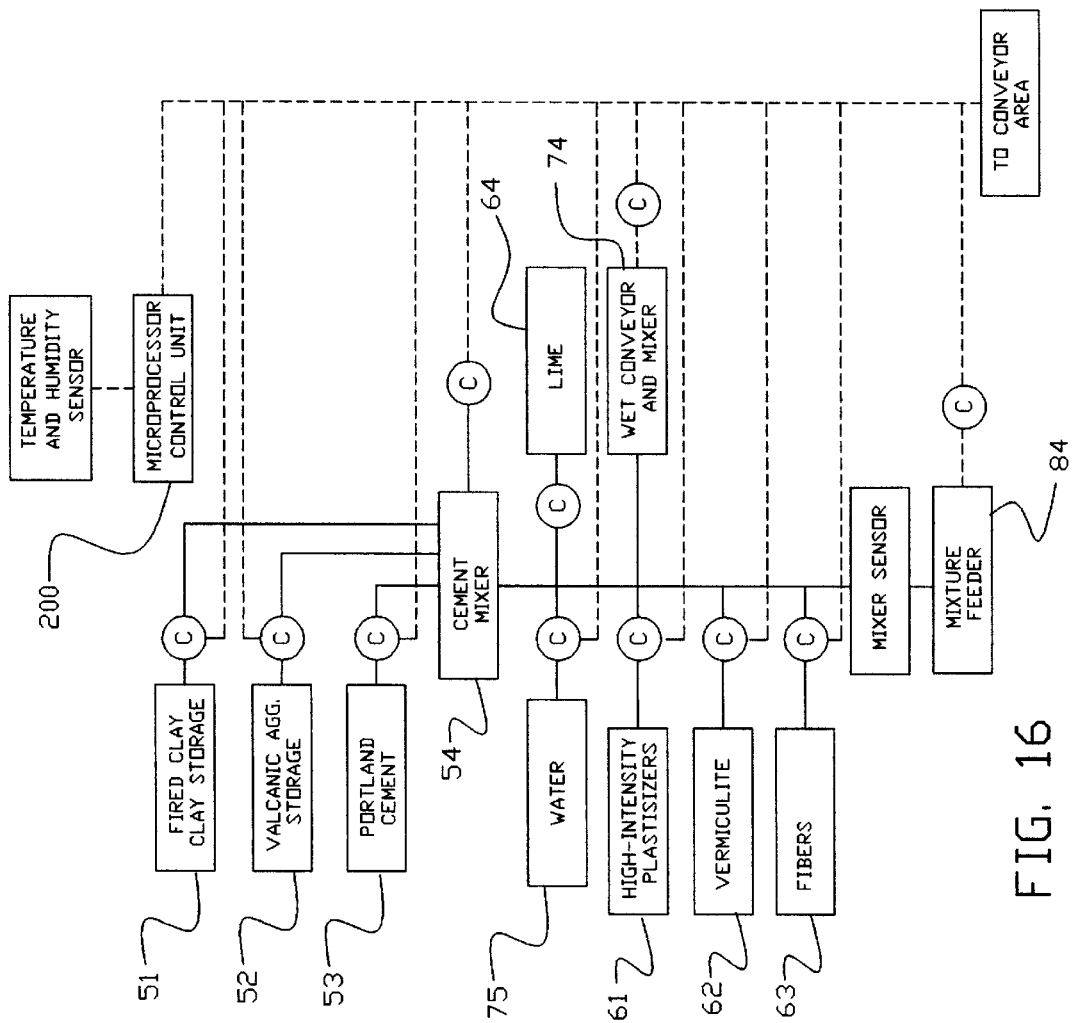
FIGS. 16 and 17 depict a schematic diagram of the various stages of the process of making wallboard according to the present invention.
Figure 17:
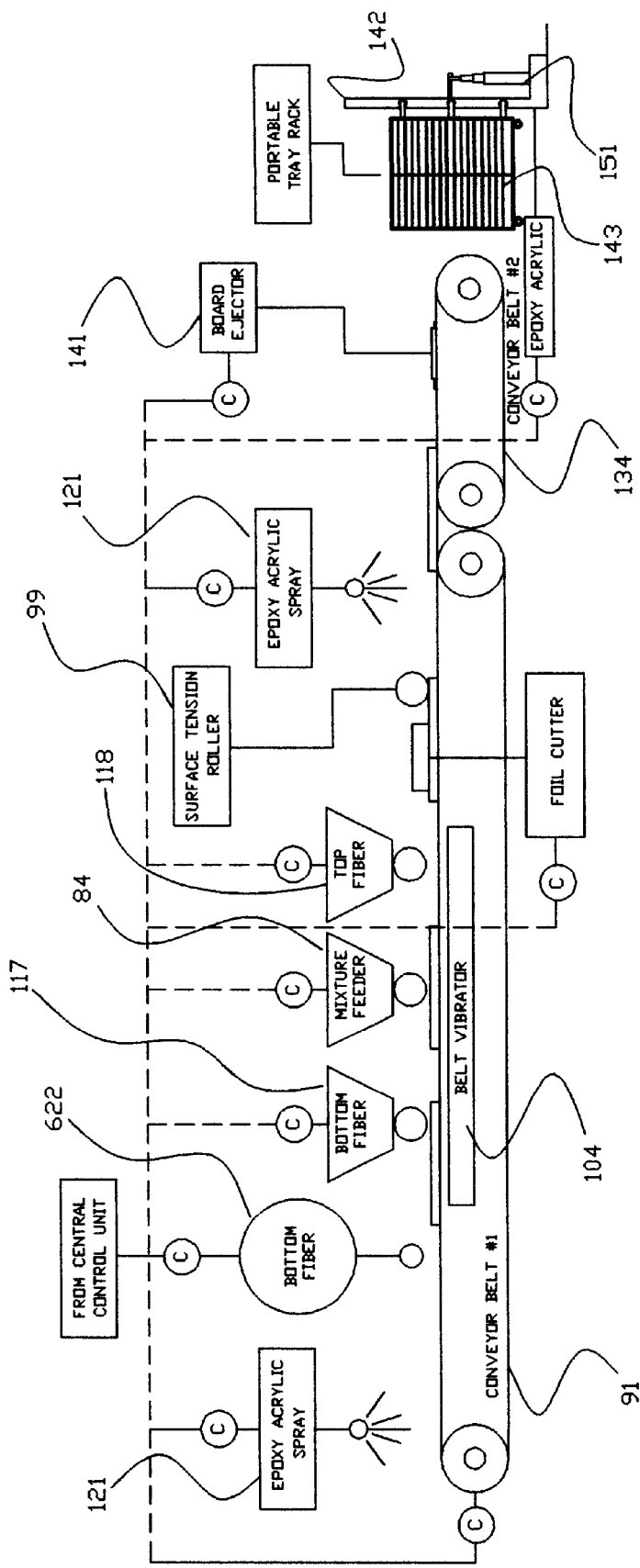

Finally, FIG. 16 is useful to demonstrate a flow diagram of the present apparatus. This flow diagram would be accurate for either the permanently installed or portable manufacturing apparatus as the structural panel is manufactured in the same way in each case.

Accordingly, it can be seen that a portable plant would not be difficult to establish and operate. Each phase of the apparatus could easily be stored and towed on one trailer and then positioned in any reasonable arrangement so as to provide the necessary material communication with the next phase of operation.

It needs to be discussed at this point that the materials which may be used to manufacture these structural panels may substantially vary, not only in the specific identities of the materials themselves, but in the relative proportions. For instance, it is well accepted that there are three grades of Portland type cement, grades 1, 2 and 3, and that these grades may vary in the amount or exclude "HIGH EARLY (R)" grades. The variances here would enable selection of cement which hardens faster or has stronger binding characteristics. In addition, a variety of clay slurries could be used. This is particularly important when the portable manufacturing apparatus as described above is considered. It is the ability to use a variety of cements and clays (and other ingredients, for that matter) which makes the portable aspects of this invention attractive. It now becomes possible to ship a portable structural panel factory in three parts to a work site and use readily available raw materials to manufacture structural panel on site. This could result in the significant advantages of flexibility in materials, reduced shipping costs, and reduction of waste.

The use of fibers is introduced in this patent to provide the surface integrity and lateral strength which was previously lacking in synthetic or manufactured structural panel. These fibers may also be selected from any one of a variety of fiber problems. For instance, the fibers could be general bi-component fibers, TREVIRA(R) fibers, polyester fibers, fiberglass fibers, CELBOND(R) fibers, or polypropylene fibers. Surely, there are a variety of other fibers which would be satisfactory for use in this manner, and there may in the very near future be new materials developed which would serve these purposes. Additionally, the fibers may be of variable width, as long as they will pass readily through the equipment used to manufacture the panel, and their length may vary anywhere from a quarter of an inch to the entire eight-foot length of a given piece of structural panel. All such alternative fibers should be seen as keeping within the spirit and scope of the present invention.

Likewise, the present invention teaches the use of certain adhesives, both to assist in the formation of a surface and to bind the foil to at least one side of the panel. These adhesives could also be selected from a variety of materials, such as high-intensity plasticisers, latexes, acrylics and acrylic polymer emulsions, epoxy acrylics, and surfactants, (mixed with or without calcium chloride). Each of these could be used with or without chemical compositions, such as Ligno Sylfonates, or Gluconolactone. All such alternative adhesives should be seen as keeping within the spirit and scope of the present invention.

Further modification and variation can be made to the disclosed embodiments without departing from the subject and spirit of the invention as defined in the following claims. Such modifications and variations, as included within the scope of these claims, are meant to be considered part of the invention as described.

What is claimed is:

1. An improved structural panel useful in interior portions of building construction, the structural panel comprising;

a blend of any one or combinations of the following standard building cement constituents to selected from the group of clay grog and Portland Cement I, II, or III;

said standard building cement constituents being supplemented with vermiculite particles as a filler;

said blend of standard building cement constituents and vermiculite filler existing in two or more layers of at least one-quarter-inch thickness within the width of said structural panel, each said layer having between them a binding layer comprising an adhesive and a disposition of synthetic fibers made of polypropylene which may of random lengths of at least one-quarter-inch which are laid between the layers of said standard building cement constituents supplemented with said vermiculite filler so that such fibers lay along the plane of each said layer's surface; and a foil surfacing on at least one side of the structural panel.

2. The improved structural panel according to claim 1 in which said foil surfacing is made of a foil which is secured to at least one exterior surface of said structural panel by means of an adhesive.

3. The improved structural panel according to claim 1 in which said synthetic fibers made of polypropylene are laid diagonally between said layers within the plane of each said layer surfaces.

4. The improved structural panel according to claim 3 in which said foil surfacing is made of a foil which is secured to at least one exterior surface of said structural panel by means of an adhesive.

* * * * *